United States Patent
Zellers

[11] 3,915,178
[45] Oct. 28, 1975

[54] DENTAL FLOSS APPLICATOR
[75] Inventor: Vernon G. Zellers, Denver, Colo.
[73] Assignee: The Raymond Lee Organization, Inc., New York, N.Y.
[22] Filed: Sept. 3, 1974
[21] Appl. No.: 502,737

[52] U.S. Cl. .............................................. 132/92 R
[51] Int. Cl.² ......................................... A61C 15/00
[58] Field of Search ...... 132/91, 89, 90, 92 A, 92 R

[56] References Cited
UNITED STATES PATENTS

| | | | |
|---|---|---|---|
| 1,389,064 | 8/1921 | Martin | 132/92 R |
| 1,417,848 | 5/1922 | MacDonald | 132/92 R |
| 1,588,307 | 6/1926 | Cammack | 132/92 R |
| 3,327,719 | 6/1967 | Ford | 132/92 R |

Primary Examiner—G. E. McNeill
Attorney, Agent, or Firm—Howard I. Podell

[57] ABSTRACT

A dental floss applicator used for the removal of foreign substance lodged between the teeth. The dental floss applicator comprises a hollow cylindrical-shaped body fitted with a pair of adjacent end arms through which the floss is drawn from a rotatable spindle of floss mounted in the internal chamber of the device. The two end arms form a yoke, so that the floss may be stretched between the arms for dental use.

4 Claims, 4 Drawing Figures

DENTAL FLOSS APPLICATOR

SUMMARY OF THE INVENTION:

A dental floss applicator used for the removal of foreign substance lodged between the teeth.

The dental floss applicator of this invention comprises a hollow cylindrical-shaped body fitted with a pair of hollow end arms oriented to form a yoke. A rotatable spindle of dental floss is mounted in the chamber of the device, with the thread of floss running from the spindle, through a passageway leading to one end arm of the yoke, across the open section of the yoke to the other end arm and through a second passageway to an exterior opening in the side of the device.

The openings of the passageways in the spindle chamber, leading to the arms, are located on a tapered section of the spindle chamber, and the end of the spindle facing the said tapered section is formed with a mating projection which presses against the floss threads leading into the passageways when the spindle is held in place by a threaded end cap mounted at the other end of the spindle to the external walls of the device.

Loosening of the end cap permits floss to be drawn off the spindle to the yoke arms and out the exit hole of the device.

BRIEF DESCRIPTION OF THE DRAWING:

The objects and features of the invention may be understood with reference to the following detailed description of an illustrative embodiment of the invention, taken together with the accompanying drawings in which.

Figure 1:
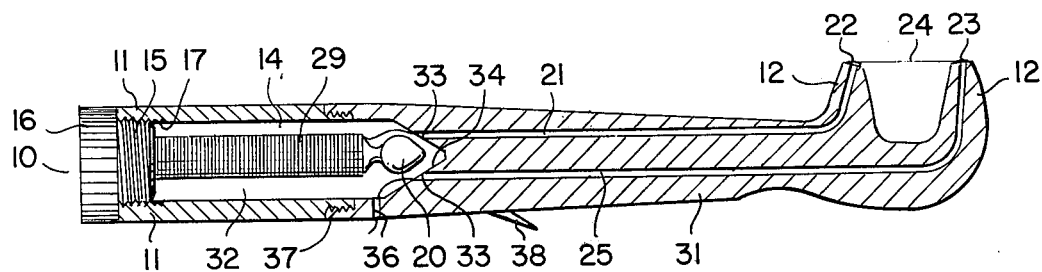
FIG. 1 illustrates a sectional view of the invention.
Figure 2:
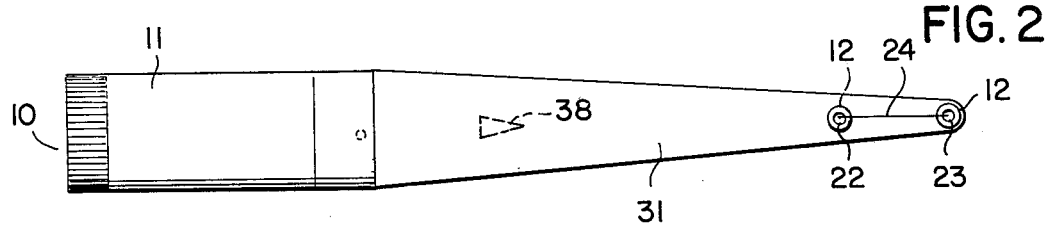
FIG. 2 illustrates a side view of the invention.
Figure 3:
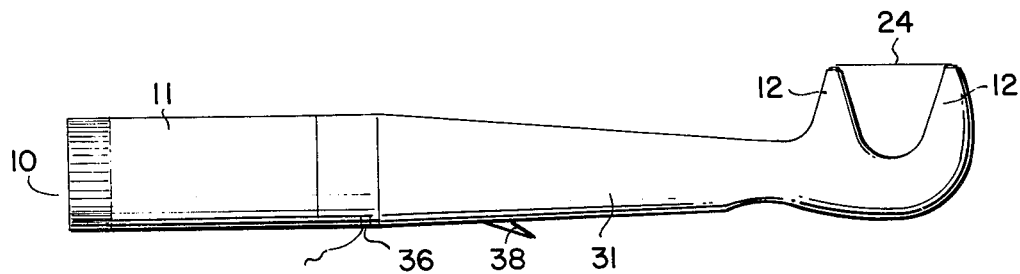
FIG. 3 illustrates an end view of the invention.
Figure 4:
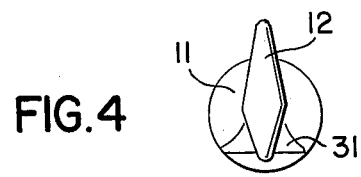
FIG. 4 illustrates a plan view of the invention.

DESCRIPTION OF THE PREFERRED EMBODIMENT:

Turning now descriptively to the drawings, in which similar reference characters denote similar elements throughout the several views, FIGS. 1–4 show the dental floss applicator 10 which is utilized for the removal of foreign substance from between the teeth.

The dental floss applicator 10 comprises a hollow cylindricalshaped body 11 which serves as a handle that is threadably engaged with an arm section 31 that terminates in two hollow fingers 12 that are spaced apart to form a yoke.

A passageway 21 in the arm section 31 joins the interior chamber 32 of the handle section 11 with the opening 22 of one finger 12, and a second passageway 25 joins the interior chamber 32 with the opening 23 of the other finger 12. The orifices 33 of both passageways 21 and 25 in the chamber 32 are located on an end tapered section 34 of the chamber 32.

A shaped spindle 14 carrying dental floss 29 is mounted axially in the chamber 32, with a rotatable end cap 16 threadably joined to female threads 17 at the end of the chamber 32 in the inner wall of the end of the handle section 11. End cap 16, when fully tightened, bears against the outer end of spindle 14 to press the tapered inner end 20 of the spindle 14 against the tapered section 34 of the chamber so as to lock in place both the spindle 14 and threads of floss 29 that enter the orifices 33 of passageways 21 and 22 in the arm section. A hole 36 is formed in the exterior wall of the chamber section 31 for exiting of the free end of dental floss 29.

The handle section 11 is detachably engaged to the arm section 31, preferably by threads 37.

In use, a thread 29 of floss is unwound from spindle 14, with end cap 16 loosened, and led through orifice 33 and passageway 21 out of a finger 12 through finger orifice 22 across the yoke section to orifice 23 of the other finger 12 and through passageway 25 to the other orifice 33 in the chamber 32 and out of the device through exit hole 36. Tightening of end cap 16 causes the tapered end 20 of spindle 14 to lock the thread 29 in place.

An external burr or knife 38 on arm 31 serves to cut excess floss after it has passed through exit hole 36.

Spindle 14 may be replaced or rewound with additional floss by removal of end cap 16, and the handle section 11 may be detached from the arm section 31 for initial threading of the floss through the device.

Since obvious changes may be made in the specific embodiment of the invention described herein, such modifications being within the spirit and scope of the invention claimed, it is indicated that all matter contained herein is intended as illustrative and not as limiting in scope.

Having thus described my invention, what I claim as new and desire to secure by Letters Patent of the United States is:

1. A dental floss applicator for holding a supply of dental floss and for maintaining a section of the dental floss exposed in taut engagement for dental use comprising A hollow handle section enclosing a chamber for storing a spindle of dental floss, An arm member detachably fastened to one end of the handle section, said arm member fitted at its free end with two spaced apart hollow finger members, and an end cap threadably mounted to the free end of the handle section, with two through individual passageways formed in the arm member that lead from an interior end of the chamber in the handle section to the interior hollow of each finger member such that the interior hollow of a first finger member is joined to a first said passageway and the interior hollow of the second finger member is joined to the second said passageway, with the hollow interior of each finger member terminating at an orifice on the exterior surface of each finger member, said spindle formed on a first end with a projection that bears against the openings in the chamber joining each of the passageways that lead to the finger members, when the spindle is axially pressed against the end of the chamber in which the openings are located by the tightening action of the end cap against the second end of the spindle, said chamber formed with a through exit hole in the chamber wall so that a thread of dental floss on the spindle may be led through the first passagewqy, through and out of one finger member, and back in the second passageway into the chamber and out of the chamber through the exit hole.

2. The combination as recited in claim 1 in which the interior end wall of the chamber where the passageways join the chamber is of a tapered shape.

3. The combination as recited in claim 2 in which the projection formed on the first end of the spindle is tapered to fit snugly against the tapered shape of the interior end wall of the chamber.

4. The combination as recited in claim 1 in which one interior end wall of the chamber is formed by the surface of a section of the arm member that abuts the chamber and the other interior end wall of the chamber is formed by the interior surface of the end cap.

* * * * *